US012586713B2

(12) United States Patent
Yan et al.

(10) Patent No.: US 12,586,713 B2
(45) Date of Patent: Mar. 24, 2026

(54) SINGLE PHASE SURFACE MOUNT SWING INDUCTOR COMPONENT AND METHODS OF FABRICATION

(71) Applicant: EATON INTELLIGENT POWER LIMITED, Dublin (IE)

(72) Inventors: Yipeng Yan, Shanghai (CN); Dengyan Zhou, Pudong (CN)

(73) Assignee: Eaton Intelligent Power Limited, Dublin (IE)

( * ) Notice: Subject to any disclaimer, the term of this patent is extended or adjusted under 35 U.S.C. 154(b) by 785 days.

(21) Appl. No.: 17/941,955

(22) Filed: Sep. 9, 2022

(65) Prior Publication Data

US 2023/0100831 A1 Mar. 30, 2023

(30) Foreign Application Priority Data

Sep. 28, 2021 (CN) ......................... 202111140825.X

(51) Int. Cl.

| | |
|---|---|
| ***H01F 17/04*** | (2006.01) |
| ***H01F 27/24*** | (2006.01) |
| ***H01F 27/29*** | (2006.01) |
| ***H01F 41/02*** | (2006.01) |

(52) U.S. Cl.

CPC ........... *H01F 27/292* (2013.01); *H01F 27/24* (2013.01); *H01F 41/0246* (2013.01)

(58) Field of Classification Search

CPC ..................................................... H01F 27/292

USPC .................................................. 336/200, 221

See application file for complete search history.

(56) References Cited

U.S. PATENT DOCUMENTS

| | | | | |
|---|---|---|---|---|
| 3,110,873 | A * | 11/1963 | Mittermaier | H01F 27/303 24/457 |
| 7,986,208 | B2 | 7/2011 | Yan | |
| 8,183,967 | B2 | 5/2012 | Yan | |
| 8,188,824 | B2 | 5/2012 | Yan | |
| 8,279,037 | B2 | 10/2012 | Yan | |
| 8,289,121 | B2 | 10/2012 | Yan | |
| 8,310,332 | B2 | 11/2012 | Yan | |
| 8,378,777 | B2 | 2/2013 | Yan | |
| 8,400,245 | B2 | 3/2013 | Yan | |
| 8,466,764 | B2 | 6/2013 | Bogert | |
| 8,659,379 | B2 | 2/2014 | Yan | |
| 8,910,373 | B2 | 12/2014 | Yan | |

(Continued)

FOREIGN PATENT DOCUMENTS

| | | | |
|---|---|---|---|
| CN | 113851303 | A | 12/2021 |
| CN | 114068153 | A | 2/2022 |

OTHER PUBLICATIONS

U.S. Appl. No. 63/139,192, filed Jan. 19, 2021, Yan.
U.S. Appl. No. 17/191,956, filed Mar. 4, 2021, Yan.

*Primary Examiner* — Ronald Hinson

(74) *Attorney, Agent, or Firm* — Baker Botts L.L.P.

(57) ABSTRACT

An inductor component includes a single conductive coil configured to establish surface mount connections with a circuit board. A magnetic core structure receives and encloses first and second legs of the single conductive coil, and first and second physical gaps are respectively formed in the magnetic core structure and are located to respectively intersect a flux path generated by current flow in only one of the elongated first or second legs. By virtue of the pair of physical gaps the inductor component operates as a swing-type inductor component with multiple steps of inductance roll off.

14 Claims, 15 Drawing Sheets

(56) References Cited

U.S. PATENT DOCUMENTS

| | | | |
|---|---|---|---|
| 8,941,457 | B2 | 1/2015 | Yan |
| 9,202,617 | B2 | 12/2015 | Zhou |
| 9,275,787 | B2 | 3/2016 | Yan |
| 9,842,682 | B2 | 12/2017 | Yan |
| 9,859,043 | B2 | 1/2018 | Yan |
| 9,870,856 | B2 | 1/2018 | Krishnamoorthy |
| 9,978,508 | B2 | 5/2018 | Yan |
| 10,020,110 | B2 | 7/2018 | Hanley |
| 10,224,140 | B2 | 3/2019 | Janis |
| 11,017,939 | B2 | 5/2021 | Krishnamoorthy |
| 2008/0310051 | A1 | 12/2008 | Yan |
| 2010/0007451 | A1 | 1/2010 | Yan |
| 2010/0007453 | A1 | 1/2010 | Yan |
| 2010/0007457 | A1 | 1/2010 | Yan |
| 2010/0013587 | A1 | 1/2010 | Yan |
| 2010/0026443 | A1 | 2/2010 | Yan |
| 2010/0039200 | A1 | 2/2010 | Yan |
| 2010/0085139 | A1 | 4/2010 | Yan |
| 2010/0171579 | A1 | 7/2010 | Yan |
| 2010/0253456 | A1 | 10/2010 | Yan |
| 2010/0259351 | A1 | 10/2010 | Bogert |
| 2010/0259352 | A1 | 10/2010 | Yan |
| 2010/0271161 | A1 | 10/2010 | Yan |
| 2010/0271162 | A1 | 10/2010 | Yan |
| 2010/0277267 | A1 | 11/2010 | Bogert |
| 2013/0021128 | A1 | 1/2013 | Yan |
| 2013/0027169 | A1 | 1/2013 | Yan |
| 2013/0099886 | A1 | 4/2013 | Yan |
| 2013/0113591 | A1 | 5/2013 | Yan |
| 2013/0113592 | A1 | 5/2013 | Yan |
| 2014/0266539 | A1 | 9/2014 | Krishnamoorthy |
| 2014/0266555 | A1 | 9/2014 | Krishnamoorthy |
| 2015/0009004 | A1 | 1/2015 | Zhou |
| 2016/0005528 | A1 | 1/2016 | Yan |
| 2016/0027575 | A1 | 1/2016 | Yan |
| 2016/0260536 | A1 | 9/2016 | Hanley |
| 2016/0276087 | A1 | 9/2016 | Yan |
| 2017/0178784 | A1 | 6/2017 | Janis |
| 2017/0178794 | A1 | 6/2017 | Yan |
| 2018/0336986 | A1* | 11/2018 | Xin ......................... H01F 17/06 |
| 2019/0295765 | A1 | 9/2019 | Yan |
| 2020/0043643 | A1* | 2/2020 | Yan ....................... H01F 27/306 |
| 2021/0125773 | A1 | 4/2021 | Yan |
| 2021/0125775 | A1 | 4/2021 | Yan |
| 2021/0407729 | A1 | 12/2021 | Yan |

* cited by examiner

SINGLE PHASE SURFACE MOUNT SWING INDUCTOR COMPONENT AND METHODS OF FABRICATION

BACKGROUND OF THE INVENTION

The field of the invention relates generally to surface mount electromagnetic component assemblies and methods of manufacturing the same, and more specifically to high current, single phase, swing-type surface mount swing inductor components and methods of manufacturing the same.

Electromagnetic inductor components are known that utilize electric current and magnetic fields to provide a desired effect in an electrical circuit. Current flow through a conductor in the inductor component generates a magnetic field that can be concentrated in a magnetic core. The magnetic field can, in turn, store energy and release energy, cancel undesirable signal components and noise in power lines and signal lines of electrical and electronic devices, or otherwise filter a signal to provide a desired output.

Increased power density in circuit board applications has resulted in a further demand for inductor solutions to provide power supplies in reduced package sizes with desired performance. Swing-type inductor components are known that desirably operate with an inductance that varies with the current load in multiple roll off steps and therefore provide performance advantages in certain applications relative to other non-swing type inductor components that operate with a single step inductance roll off characteristic. Conventional swing-type inductor solutions, however, are disadvantaged in some aspects and improvements are accordingly desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
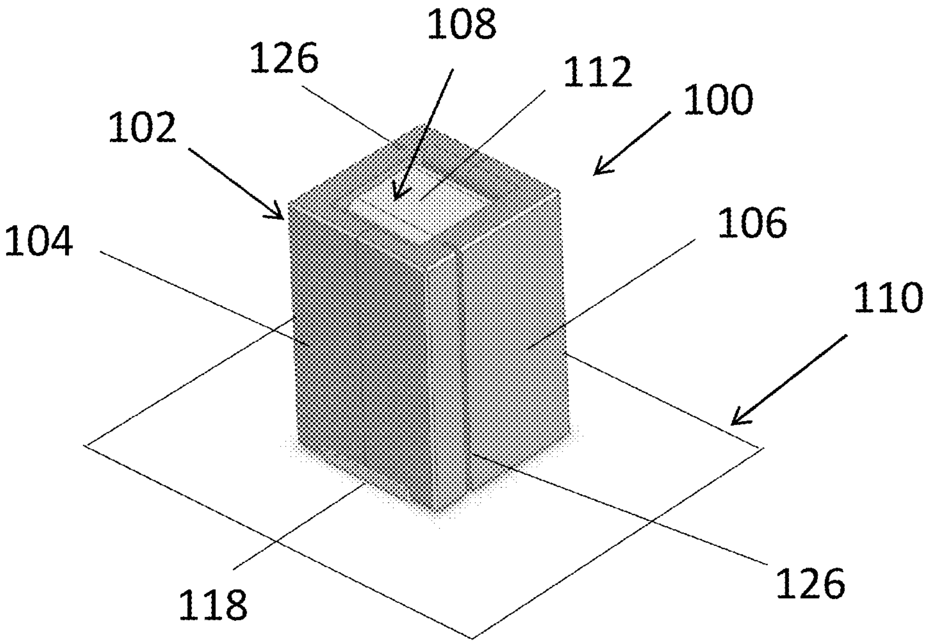
FIG. 1 is a perspective view of a first exemplary embodiment of a single phase swing inductor component in accordance with the present invention.

More powerful and high performance power supplies are highly desired in a variety of power system applications, including but not limited to state of the art telecommunications and computing (datacenter, cloud, etc.) applications. In the case of medium and low power supplies (below 40 amps), a single-phase power supply architecture may be preferred relative to more complicated and more expensive multiphase power supplies. With the latest processors, field programmable gate arrays (FPGAs), application specific integrated circuits (ASICs), and cloud computing systems, higher levels of power and greater performance are in demand. New power supply modules for high current computing applications such as servers and the like are therefore needed, but their realization is limited at least in part by limitations of conventional magnetic components needed in the operation of the power supplies. Innovative single phase inductor designs are therefore beneficially needed to realize desired performance standards in high performance, single phase power supplies to meet the demands of the marketplace.

For surface mount inductor component manufacturers, the challenge has been to provide inductor components so as to minimize the area occupied on a circuit board by the inductor component (sometimes referred to as the component "footprint") and/or to minimize the component height measured in a direction perpendicular to a plane of the circuit board (sometimes referred to as the component "profile"). By decreasing the footprint and profile of inductor components, the size of the circuit board assemblies for electronic devices can be reduced and/or the component density on the circuit board(s) can be increased, which allows for reductions in size of the electronic device itself or increased capabilities of a device with a comparable size. Miniaturizing electronic components in a cost effective manner has, however, introduced a number of practical challenges to electronic component manufacturers in a highly competitive marketplace. Because of the high volume of inductor components needed for electronic devices in great demand, cost reduction in fabricating inductor components, without sacrificing performance, has been of great practical interest to electronic component manufacturers.

In general, each generation of electronic devices needs to be not only smaller, but offer increased functional features and capabilities. As a result, the electronic devices must be increasingly powerful devices. For some types of components, such as electromagnetic inductor components that, among other things, may provide energy storage and regulation capabilities, meeting increased power demands while continuing to reduce the size of inductor components that are already quite small, has proven challenging as a general proposition, and especially challenging for certain applications.

In some cases, single-phase inductor components desirably operate with low inductance and high inductance for fast load transient response, high DC bias current resistance, and high efficiency individually. With continuous inductor size reduction, it is more and more challenging to achieve both high initial inductance and high DC bias current resistance together with conventional single step inductance drop characteristics, sometimes referred to as inductance roll off.

Swing-type inductor components are known that are self-adjustable to achieve optimal trade-off between transient performance, DC bias current resistance and efficiency in power converter applications. Unlike other types of inductor components wherein the inductance of the component rolls off in a singular manner at a predetermined saturation point, swing-type inductors are operable at full and partial saturation points with respectively different and optimal inductance roll off characteristics to more flexibly meet the needs of specific applications. Specifically, the swing-type inductor component may include a core that can be operated almost at magnetic saturation under certain current loads. The inductance of a swing core is at its maximum for a range of relatively small currents, and the inductance changes or swings to a lower value for another range of relatively higher currents. Single phase, swing-type inductors and their multiple step inductance roll off characteristics can avoid the limitations of other types of inductor components in power converter applications, but tend to be difficult to economically manufacture in desired footprints while still delivering desired performance. Improvements in single phase swing-type inductor components are accordingly desired.

Exemplary embodiments of single phase, surface mount, swing-type inductor components are described hereinbelow that may more capably perform in higher current, higher power circuitry than conventional single phase inductor components now in use. The exemplary embodiments of single phase inductor component assemblies are further manufacturable at relatively low cost and with simplified fabrication processes and techniques. Desired miniaturization of the exemplary embodiments of single phase inductors is also facilitated to provide surface mount inductor components with smaller package size, yet improved capabilities in high current applications. Method aspects will be in part apparent and in part explicitly discussed in the description below.

Figure 2:
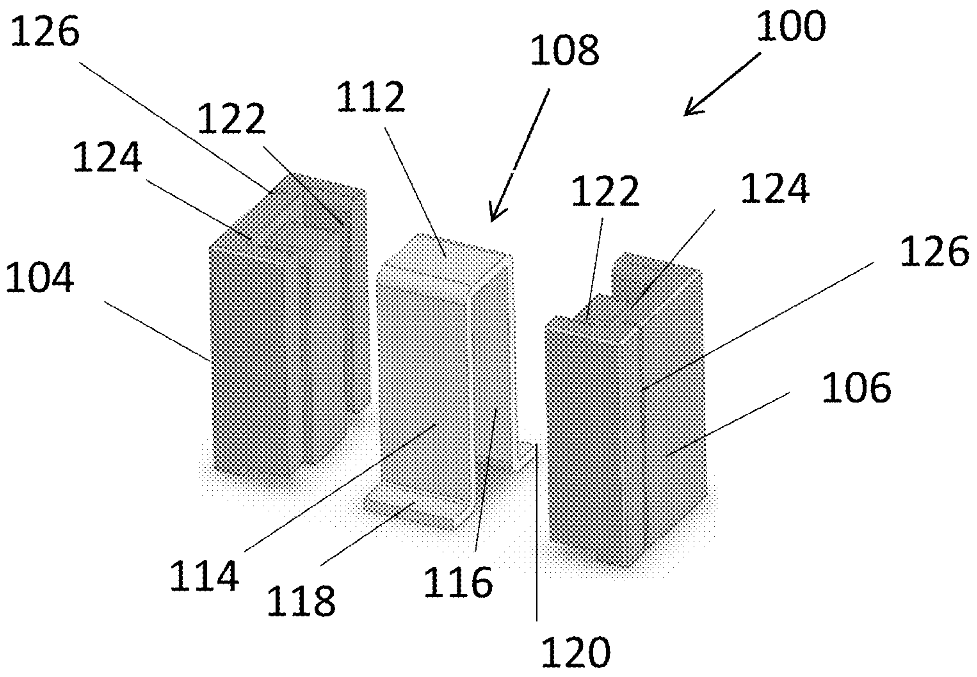
FIG. 2 is an exploded view of the single phase swing inductor component shown in FIG. 1.
Figure 3:
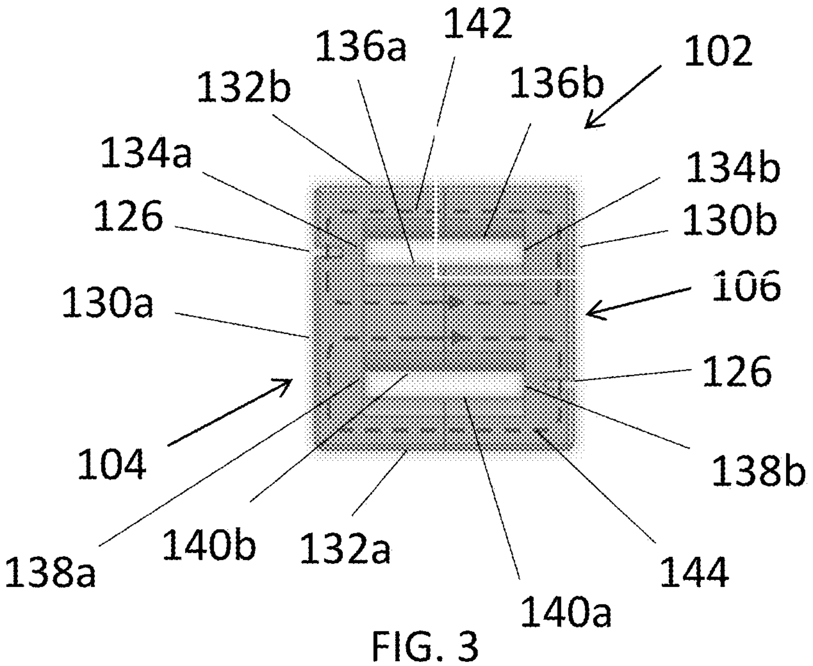
FIG. 3 is a top view of the magnetic core structure shown in FIGS. 1 and 2.

FIGS. 1-3 illustrate a first exemplary embodiment of a single phase swing inductor component 100 in accordance with the present invention. The component 100 includes a magnetic core structure 102 fabricated in two discrete core pieces 104, 106 that each respectively receive and contain a portion of a single conductive coil 108 that may be surface mounted to a circuit board 110. The circuit board 110 and the swing inductor component 100 define a portion of power supply circuitry included in an electronic device. In a contemplated embodiment, the power supply circuitry on the circuit board 110 may implement a single phase power supply architecture including a power converter connected to the coil 108 of the swing inductor component 100. More specifically, the swing inductor component 100 may be connected through the circuit board 110 to an output of a single phase power converter.

Alternatively, in another contemplated embodiment the swing inductor component 100 may be connected to one, and only to one, phase of a multiphase power system and multiphase power system converter. As such, the "single phase" swing inductor component, for the purposes of the present description, shall mean that the swing inductor component includes one and only one conductive coil 108 connectable to only one phase of power through the circuit board 110. Such "single phase" swing inductor components 100 are therefore specifically contrasted with alternative integrated inductor components having more than one conductive coil (e.g., two, three, four, etc.) in an amount equal to the number of phases of the multiphase power supply in an integrated, common core structure that is configured to accommodate the desired number of coils. For example, in a two phase power system, two single phase swing inductor components 100 may be used on the circuit board instead of one integrated inductor component having two coils on a common magnetic core structure.

In some cases, more than one single phase swing inductor component 100 may be provided on the circuit board 110, with each of the components 100 being individually and independently operable with respect to the power phase to which it is connected on the circuit board 110, whether in a single phase or multiphase power supply architecture. As single phase and multiphase power supply architecture and single and multiphase power converters (e.g., buck converters) are known and within the purview of those in the art, further description thereof is omitted herein. The use of the components 100 in power converter circuitry is, however, provided for the sake of illustration rather than limitation, and other power supply applications are possible.

As shown in FIG. 1, the magnetic core pieces 104, 106 are arranged side-by-side on the circuit board 110 in the arrangement shown to complete the magnetic core structure 102 with the single conductive coil 108 captured therebetween. The bottom of each core piece 104 and 106 faces the circuit board 110 in use and each core piece 104 and 106 extends upwardly from the circuit board 110. In the illustrated example, the magnetic core structure 102 defined by the combination of core pieces 104, 106 has about equal length and width dimensions measured in corresponding directions parallel to the plane of the circuit board 110 such that the magnetic core structure 102 is generally square in top view as shown in FIG. 3. In a direction perpendicular to the plane of the circuit board 110 (i.e., in the vertical direction shown in FIG. 1), however, the vertical height dimension of the magnetic core structure 102 is significantly greater than the length or width dimensions of the magnetic core structure 102. In the illustrated example, the height dimension of the magnetic core structure 102, and the corresponding height dimension of the component 100, is about twice the length or width dimension of the magnetic core structure 102. This need not be the case in all embodiments, however, and different proportions of length, width and height of the component 100 are possible in various different embodiments.

Referring now to the exploded view of FIG. 2, the single conductive coil 108 is an inverted U-shaped coil having a top section 112 that extends parallel to the plane of the circuit board 110 in an exposed but recessed manner on the top side of the magnetic core pieces 104, 106 at a distance spaced from the plane of the circuit board 110. As such, the top section 112 of the coil 108 is spaced a vertical distance from the circuit board 110 a bit less than the overall height of the swing inductor component 100. The coil 108 further includes elongated, spaced apart, straight and parallel leg sections 114, 116 each extending perpendicular to the top section 112 at each opposing end edge of the top section 112. The axial length of each of the elongated leg sections 114, 116 is much greater than the axial length of the top section 112 such that the coil 108 shown is much taller than it is wide. At the lower end of each leg section 114, 116 a surface mount termination pad 118, 120 extends perpendicularly to and away from the ends of each leg section 114, 116.

The coil 108 may be fabricated from a sheet of conductive material cut into a strip having a rectangular cross section of uniform thickness that is formed or bent in the particular shape having the particular features shown. The coil 108 may be provided in the shape as shown as a fully preformed element that can be simply assembled with the magnetic core pieces 104, 106 at a separate stage of manufacture without additional forming or shaping of the coil 108 being required. The inverted U-shaped coil 108 as shown and described is rather simply shaped and capably operates in higher power, higher current circuitry. The inverted U-shaped coil 108 completes less than one complete turn of an inductor winding in the magnetic core structure 102, although it is appreciated that alternative coil configurations and coil configurations completing one or more full turns are possible in other embodiments.

The magnetic core piece 104 is formed with a pair of interior, spaced apart straight and parallel coil slots 122, 124 that are complementary in shape to but slightly larger than the legs 114 or 116 of the coil 108. In the example shown, the coil slots 122, 124 are elongated rectangular openings that accept the rectangular side edges of the elongated coil legs 114 or 116. The interior core slots 122, 124 are open and accessible on the top and bottom of the core piece 104 but not from the exterior lateral sides of the core piece 104 that extend between the top and bottom of the core piece 104. For the purposes herein, the bottom of the core piece 104 seats upon the circuit board 110, the top side of the core piece 104 extends generally parallel to and spaced from the circuit board 110 in use, and the lateral sides of the core piece 104 extend perpendicular to the circuit board 110.

The core piece 106 is likewise formed with a pair of interior spaced apart straight and parallel coil slots 122, 124 that are complementary in shape to but slightly larger than the legs 114 or 116 of the coil 108. In the example shown, the coil slots 122, 124 are elongated rectangular openings that accept the rectangular side edges of the elongated coil legs 114 or 116. The interior core slots 122, 124 are open and accessible on the top and bottom of the core piece 106 but not from the exterior lateral sides of the core piece 106 that extend between the top and bottom of the core piece 106. For the purposes described herein, the bottom of the core piece 106 seats upon the circuit board 110, the top side of the core piece 106 extends generally parallel to and spaced from the circuit board 110 in use, and the lateral sides of the core piece 106 extend perpendicular to the circuit board 110.

The coil slots 122, 124 in the magnetic core pieces 104, 106 extend partially through the core pieces 104, 106 and are oriented to extend perpendicularly to the plane of the circuit board 110 in each magnetic core piece 104, 106. The coil slots 122, 124 therefore extend vertically inside the core pieces 104, 106 in the view of FIG. 1. As seen in FIG. 2, the bottom of each core piece 104, 106 is slightly recessed to provide a clearance from the surface of the circuit board 110 where the surface mount termination pads 118, 120 meet the circuit board 110 to complete the desired surface mount electrical connections to the circuit board 110.

The discrete magnetic core pieces 104 and 106 each define ½ of the magnetic core structure 102 and receive the single conductive coil 108 therebetween. As such, each of the core pieces 104, 106 are formed with ½ of coil slots 122, 124. The discrete magnetic core pieces 104, 106 are easily assembled to and around the coil 108 with a sliding assembly to inter-fit with the legs 114, 116 of the coil 108 in the core slots. In the illustrated example, the coil slots 122, 124 impart an E-shaped profile and cross-section to each of the core pieces 104, 106 which is rather simply and easily fabricated relative to more complicated core shapes that are known in certain types of conventional inductor components.

Each of the discrete magnetic core pieces 104, 106 is further formed with a physical gap 126 in the form of a vertically extending (i.e., in a direction perpendicular to the plane of the circuit board 110) elongated slot or groove that is operative with respect to one of the coil legs 114, 116 to impart swing-type inductor operability to the component 100. The core pieces 104, 106 in the example shown are formed as identically shaped core pieces that each include only physical gap 126. In the assembly of the component 100 the orientation of the core pieces 104, 106 is shifted or reversed 180° relative to one another, such that the interior coil slots in each core piece 104 face one another. In the same shifted or reversed 180° orientation of the core pieces 104, 106 the physical gap 126 in each core piece 104, 106 is located adjacent to one of the coil legs 114, 116 but not the other coil leg in each core piece. As such, the identically shaped core pieces 104, 106 are specifically distinguished from core pieces that have more than one physical gap operating with respect to more than one coil leg in the same magnetic core piece. The magnetic core pieces 104, 106 including only one physical gap are therefore slightly easier to fabricate than magnetic core pieces having more than one physical gap.

FIG. 3 shows the magnetic core structure 102 without the coil 108. The magnetic core pieces 104, 106 are abutted side-by-side in the 180° orientation as shown, and in some cases the facing sides of the core pieces 104, 106 may be gapped from one another to realize a desired inductance of the magnetic core structure 102 in operation.

The combination of core pieces 104, 106 define a pair of opposing exterior side walls 130*a*, 130*b* and a pair of opposing exterior side walls 132*a*, 132*b* corresponding to the lateral exterior side walls of the generally square magnetic core structure 102. The exterior side walls 130*a*, 130*b*, 132*a*, 132*b* are spaced from the legs 114, 116 of the coil 108 that are surrounded by and enclosed in the magnetic core structure 102 in the completed assembly of the component 100.

The combination of core pieces 104, 106 also define a first pair of interior side walls 134*a*, 134*b* and a pair of opposing interior side walls 136*a*, 136*b* that collectively define a rectangular coil slot receiving and enclosing the coil leg 116. The interior side walls 134*a*, 134*b*, 136*a*, 136*b* therefore extend adjacent to and surround the coil leg 116 in the completed assembly of the component 100. The combination of core pieces 104, 106 likewise define a first pair of interior side walls 138*a*, 138*b* and a pair of opposing interior side walls 140*a*, 140*b* that collectively define a rectangular coil slot receiving and enclosing the coil leg 114. The interior side walls 138*a*, 138*b*, 140*a*, 140*b* therefore extend adjacent to and surround the coil leg 114 in the completed assembly of the component 100.

As current flows through the coil leg 116, a first magnetic flux path 142 (shown with hyphenated lines) extends in the magnetic core structure 102 around the rectangular coil slot defined by the interior side walls 134*a*, 134*b*, 136*a*, 136*b*. Likewise, as current flows through the coil leg 114, a second magnetic flux path 144 (shown with hyphenated lines) extends in the magnetic core structure 102 around the rectangular coil slot defined by the interior side walls 138*a*, 138*b*, 140*a*, 140*b*. Because the current flow through the coil legs 114 and 116 is oppositely directed, the flux paths 144 and 142 are likewise oppositely directed as shown by the directional arrows in FIG. 3.

Each physical gap 126 is formed in one of the exterior side walls 130*a*, 130*b* in the magnetic core structure, and the physical gap 126 extends incompletely through the wall thickness of the magnetic core structure 102 such that the physical gaps are open and exposed on the exterior of the magnetic core structure 102 but do not extend to the interior side walls of the magnetic core structure 102. Each of the physical gaps 126 are located to respectively intersect a portion of the flux path 142 or 144 generated by the respective coil legs. As shown in the example of FIGS. 1 through 3, one of the vertically extending gaps 126 extends on the left hand side of one of the coil slots to intersect the flux path 142 while the other gap 126 extends on the right hand side of the other of the coil slots in the magnetic core structure 102 to intersect the other flux path 144. As such, the gaps 126 are offset from one another on the opposing exterior side walls of the magnetic core structure 102 and the gaps 126 are also oppositely situated with respect to the coil slots in the magnetic core structure 102. Considering the rectangular cross section of the coil legs 114 and 116, the coil slots in the magnetic core structure 102 includes a corresponding long side and a short side from the top and in cross section. The physical gaps 126 in the example shown are elongated grooves extending parallel to the long side of the coil slots in the horizontal plane of FIG. 3. As such, while the gaps 126 extend longitudinally or axially in the vertical direction between the top and bottom of the magnetic core structure 102, in the lateral direction (i.e., in the horizontal direction in FIG. 3) the gaps 126 extend in a linear manner for a depth less than the wall thickness of the magnetic core structure 102. In the view of FIG. 3, the gaps 126 in the lateral direction are oriented to extend perpendicular to the short sides of the coil slots and parallel to the long sides.

The physical gap 126 in each respective flux path 142, 144 strategically reduces a cross sectional area of the magnetic core structure 102 to purposely saturate a portion of the magnetic core at a desired current before the rest of the flux path 142, 144 reaches complete magnetic saturation. This beneficially allows a partial saturation of the magnetic core structure 102 to achieve desirable swing inductor effects wherein the completed component 100 is operable at more than one inductance value in different ranges of operating currents. Interruption of the flux path in localized areas via the physical gaps 126 realizes desirable swing-type inductor characteristics wherein the component 100 operates with an inductance that desirably and automatically varies with the current load.

Specifically, and by virtue of the gaps 126, the magnetic core structure 102 can be operated almost at a maximum level for a range of relatively small currents, and the inductance changes or swings to lower values for another range of relatively higher currents. The actual high and lower inductance values and accompanying low and high current ranges in use may vary depending on the magnetic material utilized to fabricate the core pieces 104, 106; an amount of gapping between the core pieces (if any); the specifics of the physical gaps 126 (e.g., length width and depth and the location of the groove in the flux path) in each core piece that impart the desired swing inductor function; and also the specifics of the coil 108 (e.g., dimensions and electrical properties of the metal or alloy used to fabricate the coil 108). Considerably flexibility is present by varying one or more of the attributes above to tailor a swing inductor component for specific use to meet the needs of different applications.

The magnetic materials used to fabricate each respective core pieces 104 and 106 may be selected from a variety of soft magnetic particle materials known in the art and formed into the illustrated shapes according to known techniques such as molding of granular magnetic particles to produce the desired shapes. Soft magnetic powder particles used to fabricate the magnetic core pieces may include Ferrite particles, Iron (Fe) particles, Sendust (Fe—Si—Al) particles, MPP (Ni—Mo—Fe) particles, HighFlux (Ni—Fe) particles, Megaflux (Fe—Si Alloy) particles, iron-based amorphous powder particles, cobalt-based amorphous powder particles, Mn—Zn power ferrite materials, Mn—Zn high permeability ferrite core materials, and other suitable materials known in the art. In some cases, magnetic powder particles may be coated with an insulating material such the magnetic core pieces may possess so-called distributed gap properties familiar to those in the art and fabricated in a known manner. In various embodiments, the magnetic core pieces 104 and 106 may be fabricated from the same magnetic material or from different magnetic materials as desired.

Figure 4:
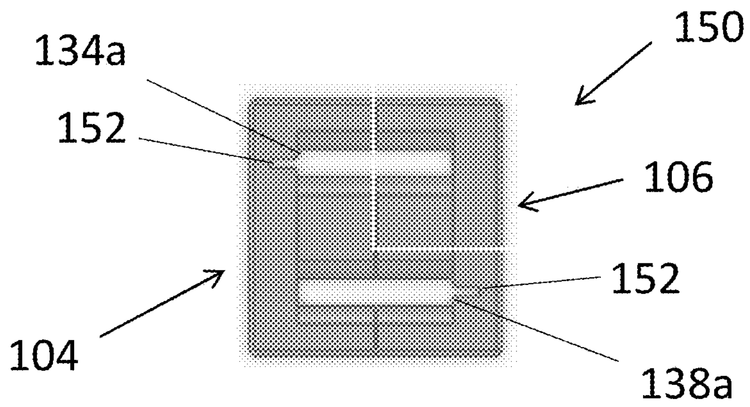
FIG. 4 is a top view of a first exemplary alternative magnetic core structure to that shown in FIG. 3.

FIG. 4 illustrates a first alternative core structure 150 that may be utilized in lieu of the magnetic core structure 102 in the component 100. The magnetic core structure 150 is similar to the magnetic core structure 102 and therefore includes magnetic core pieces 104 and 106. Each core piece 104 and 106 includes only one physical gap 152, however, in lieu of the gap 126.

In the assembly of the magnetic core structure 150 the first gap 152 extends from the interior side wall 134*a* and the second gap 162 extends from the interior side wall 138*b*. In the horizontal direction shown in FIG. 4, each physical gap 152 extends incompletely through the wall thickness of the magnetic core structure 150 such that the physical gaps 152 are open on the interior of the magnetic core structure 102 but do not extend to the exterior side walls of the magnetic core structure 150. Each of the physical gaps 152 are located to respectively intersect a portion of the flux path 142 or 144 (FIG. 3) generated by the coil legs, and similar swing inductor effects and benefits are realized to those described above for the component 100 including the magnetic core structure 102. The gaps 152 each extend vertically in the axial direction between the top and bottom of the magnetic core structure.

Figure 5:
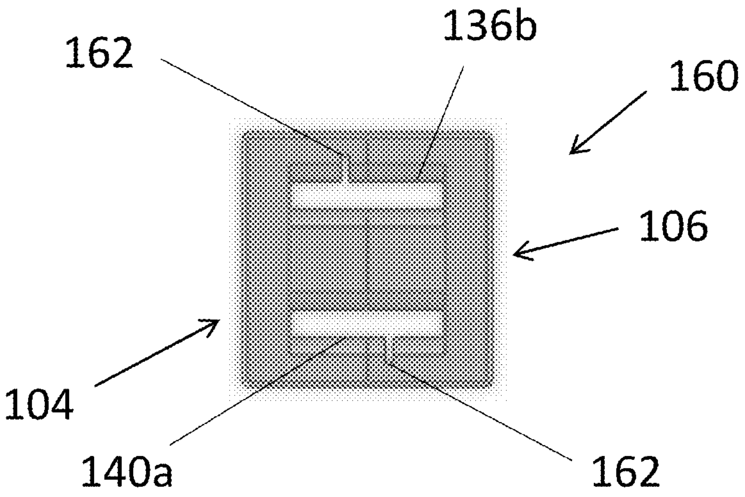
FIG. 5 is a top view of a second exemplary alternative magnetic core structure to that shown in FIG. 3.

FIG. 5 illustrates a second alternative core structure 160 that may be utilized in lieu of the magnetic core structure 102 in the component 100. The magnetic core structure 160 is similar to the magnetic core structure 102 and therefore includes magnetic core pieces 104 and 106. Each core piece 104 and 106 includes only one physical gap 162, however, in lieu of the gap 126.

In the assembly of the magnetic core structure 160 the first gap 162 extends from the interior side wall 136*b* and the second gap 162 extends from the interior side wall 140*a*. In the horizontal direction, each physical gap 162 extends incompletely through the wall thickness of the magnetic core structure 160 such that the physical gaps 162 are open on the interior of the magnetic core structure 102 but do not extend to the exterior side walls of the magnetic core structure 160.

Considering the rectangular cross section of the coil legs 114 and 116, the coil slots in the magnetic core structure 160 include a corresponding long side and a short side from the top and in cross section. The physical gaps 162 in the example shown are elongated linear grooves extending perpendicular to the long side of the coil slot in the lateral direction shown in FIG. 5, while the gaps 162 also extend vertically in the axial direction between the top and bottom of the magnetic core structure. Each of the physical gaps 162 are located to respectively intersect a portion of the flux path 142 or 144 (FIG. 3) generated by the coil legs, and similar swing inductor effects and benefits are realized to those described above for the component 100 including the magnetic core structure 102.

Figure 6:
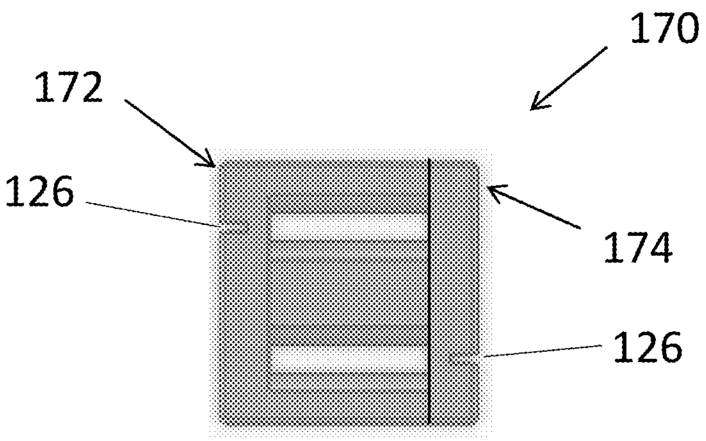
FIG. 6 is a top view of a third exemplary alternative magnetic core structure to that shown in FIG. 3.

FIG. 6 illustrates a third alternative core structure 170 that may be utilized in lieu of the magnetic core structure 102 in the component 100. Unlike the magnetic core structure 102 the magnetic core structure 170 includes different shaped magnetic core pieces 172 and 174. The magnetic core piece 172 is an enlarged version of the E-shaped core 104 described above, while the magnetic core piece 174 is a simply shaped flat plate. As such, the magnetic core piece 172 defines an entirety of the coil slots in the magnetic core structure 172 while the magnetic core piece 174 closes or covers the coil slots. Each piece includes a physical gap 126 that is located to respectively intersect a portion of the flux path 142 or 144 (FIG. 3) generated by the coil legs, and similar swing inductor effects and benefits are realized to those described above for the component 100 including the magnetic core structure 102.

While axially extending vertical physical gaps extending between the top and bottom of the magnetic core structure are featured in the embodiments shown and described above, it is recognized that similar swing inductor effects could be realized with horizontally extending gaps if desired. For example, in one contemplated alternative embodiment, a horizontally extending physical gap could be formed in the interior or exterior surfaces of the magnetic core pieces. In such an embodiment, the physical gap would extend between opposite side walls of the magnetic core structure instead of the top and bottom of the magnetic core structure. As long as the horizontal physical gaps intersect the flux paths to achieve the desired partial saturation under certain current loads, swing inductor functionality will still be desirably obtained.

Figure 7:
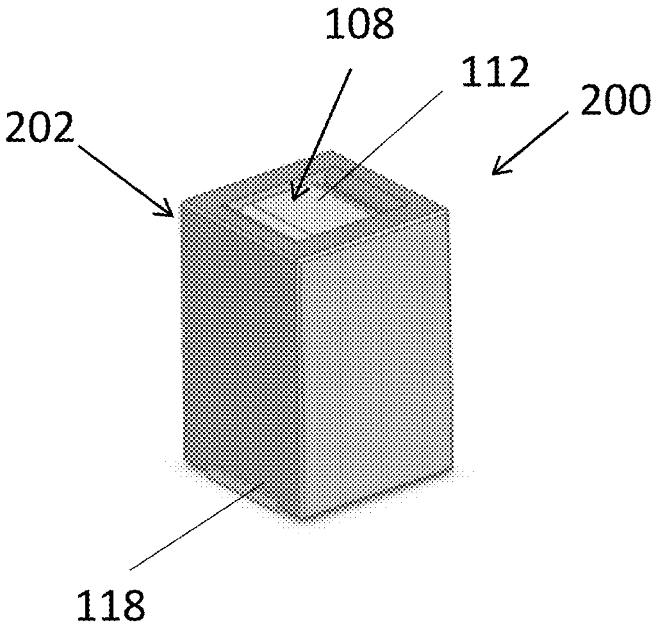
FIG. 7 is a perspective view of a second exemplary embodiment of a single phase swing inductor component in accordance with the present invention.

FIG. 7 is a perspective view of a second exemplary embodiment of a single phase swing inductor component 200 in accordance with the present invention. The swing inductor component 200 may be used in lieu of or in addition to the swing inductor component 100 on the circuit board 110 (FIG. 1).

Figure 8:
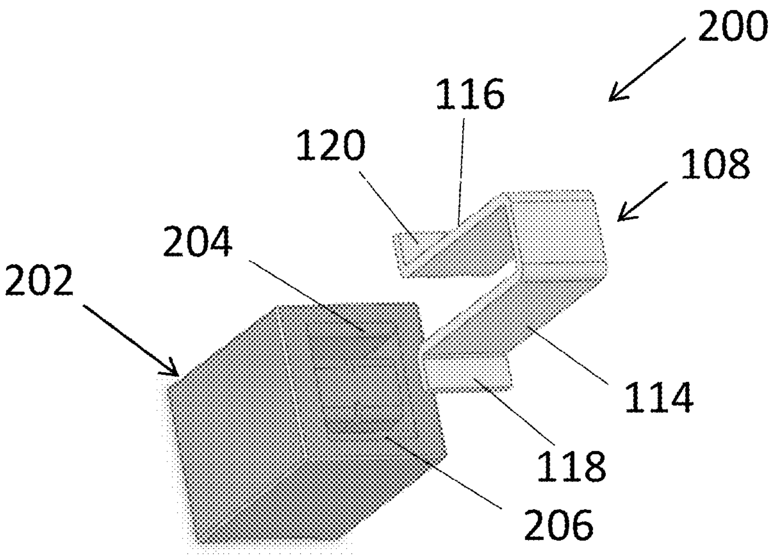
FIG. 8 is an exploded view of the single phase swing inductor component shown in FIG. 7.

The component 200 is similar to the component 100 but instead of including a two piece magnetic core structure the component 200 includes a single piece, integrally formed magnetic core structure 202. That is, instead of two magnetic core pieces assembled about the coil 108 as in the component 100, the magnetic core structure 202 is formed as one and only one monolithic magnetic piece including complete coil slots 204, 206 on the interior thereof as shown in the exploded view of FIG. 8. In the assembly of the component 200 the coil legs 114, 116 are inserted through the coil slots 204, 206 from the top side of the magnetic core structure 202, and the termination pads 118, 120 are then formed on the bottom side of the magnetic core structure 202 for surface mounting to the circuit board 110 in the completed component 200. The package size of the component 200 and the component 100 may be otherwise the same, and very similar performance may be realized in the two components 100 and 200.

Figure 9:
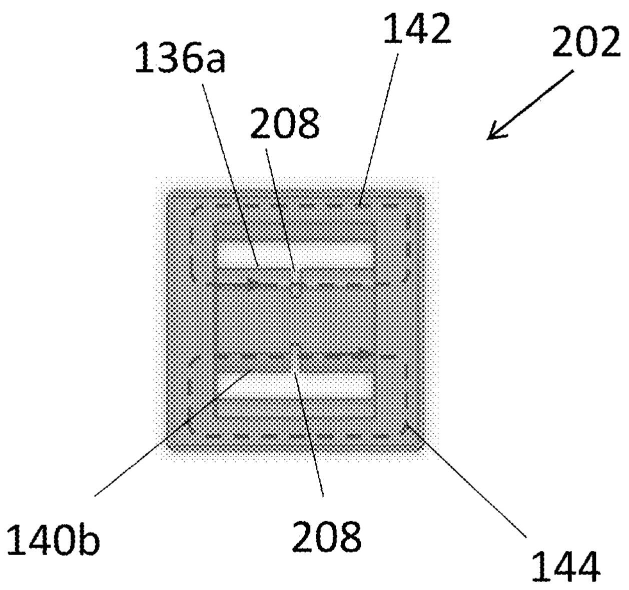
FIG. 9 is a top view of the magnetic core structure for the single phase swing inductor component shown in FIGS. 7 and 8.

As best seen in FIG. 9, the magnetic core structure 202 includes the same interior and exterior sidewalls as the magnetic core structure 102 described above, and similar flux paths 142, 144 are generated by the coil legs as current flows thorough the coil legs in the component 200. Physical gaps 208 are formed on the interior side walls 136*a*, 136*b* that impart swing-inductor characteristics by intersecting the flux paths. The physical gaps 208 extend incompletely through the wall thickness of the magnetic core structure 202, and in the example shown are aligned with one another on a common centerline of the magnetic core structure, unlike the previously described gaps above that are not aligned with a centerline of the magnetic core structures. Further, in the lateral or horizontal direction shown in FIG. 9, the gaps 208 extend toward one another instead of away from one another like the gaps shown in the embodiments of FIGS. 2-6. The gaps 208 further extend in the axial direction or vertical direction from the bottom of the magnetic core structure 202 to a point just below the top section 112 of the coil 108.

Figure 10:
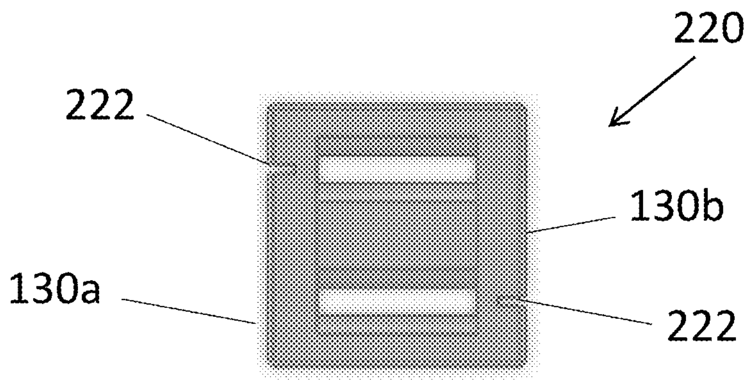
FIG. 10 is a top view of a first exemplary alternative magnetic core structure to that shown in FIG. 9.

FIG. 10 shows a first exemplary alternative single piece magnetic core structure 220 for the component 200. The magnetic core structure 220 includes physical gaps 222 formed in the exterior side walls 130*a*, 130*b* and realizing swing-inductor functionality in a similar arrangement to that described above in relation to FIG. 3.

Figure 11:
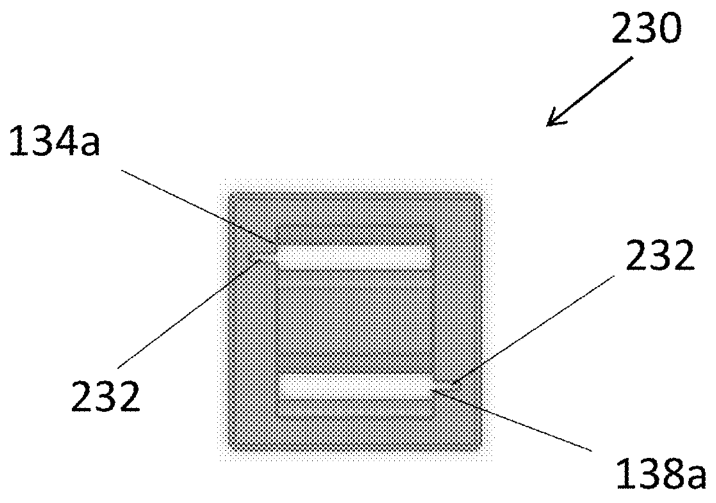
FIG. 11 is a top view of a second exemplary alternative magnetic core structure to that shown in FIG. 9.

FIG. 11 shows a second exemplary alternative single piece magnetic core structure 230 for the component 200. The magnetic core structure 230 includes physical gaps 232 formed in the interior side walls 134*a*, 138*a* and realizing swing-inductor functionality in a similar arrangement to that described above in relation to FIG. 4.

Figure 12:
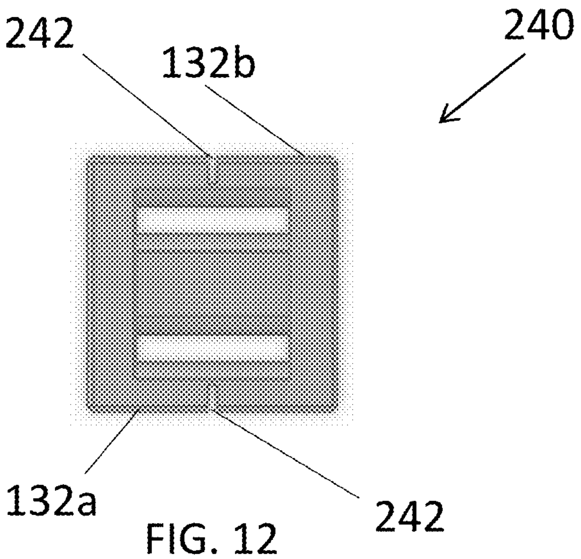
FIG. 12 is a top view of a third exemplary alternative magnetic core structure to that shown in FIG. 9.

FIG. 12 shows a third exemplary alternative single piece magnetic core structure 240 for the component 200. The magnetic core structure 240 includes physical gaps 222 formed in the exterior side walls 132*a*, 132*b* and realizing swing-inductor functionality by intersecting flux paths on opposite sides of the coil slots relative to the embodiment shown in FIG. 9.

Figure 13:
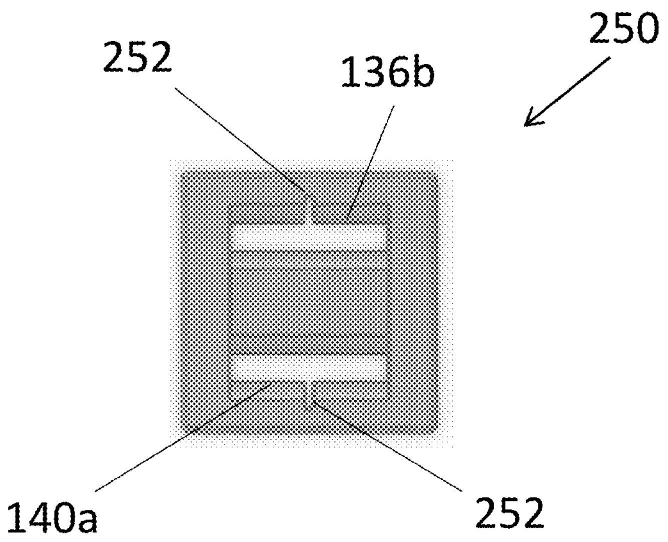
FIG. 13 is a top view of a fourth exemplary alternative magnetic core structure to that shown in FIG. 9.

FIG. 13 shows a fourth exemplary alternative single piece magnetic core structure 250 for the component 200. The magnetic core structure 250 includes physical gaps 252 formed in the interior side walls 136*b*, 140*a* and realizing swing-inductor functionality by intersecting the flux paths on opposite sides of the coil slots.

Having now described examples of one piece and two magnetic core structures having physical gaps intersecting the flux paths of the coil legs at different locations, those in the art will no doubt realize that further locations of physical gaps are possible in further and/or alternative embodiments while realizing similar benefits to the examples set forth herein. As such, the examples are set forth for the purposes of illustration rather than limitation. Numerous adaptations of components including interior and/or exterior gaps at various locations other than those specifically described and illustrated above are possible.

Figure 14:
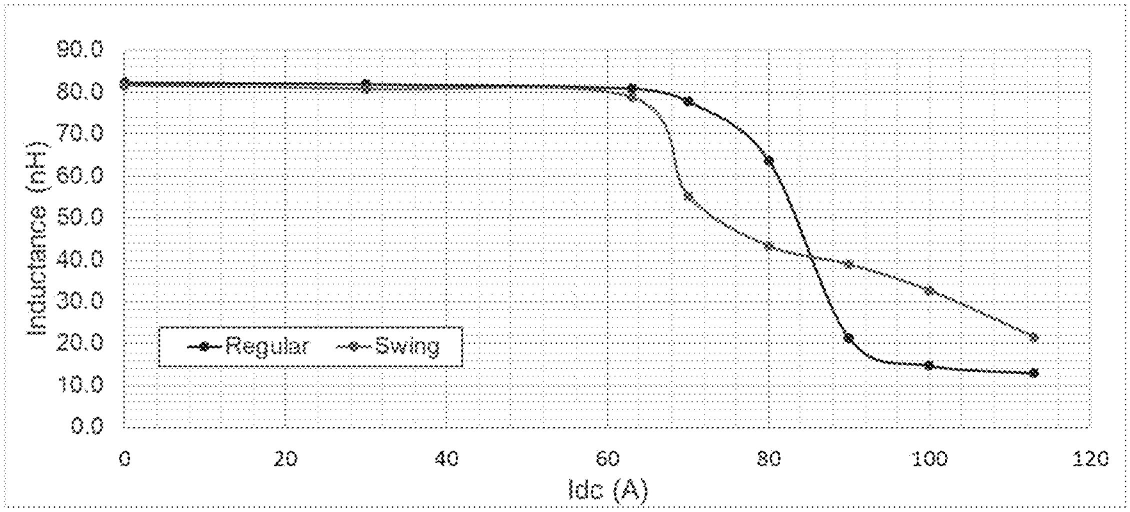
FIG. 14 is a first exemplary graphical illustration of steps of inductance roll off characteristics of a swing inductor in accordance with the present invention.

FIG. 14 is a first exemplary graphical illustration of steps of inductance roll off characteristics of a swing inductor that may be exhibited in the inductor components 100, 200 including the magnetic core structures 102, 150, 160, 170, 202, 220, 230, 240 and 250 described above relative to inductance roll off characteristics of regular or conventional non-swing type inductor components for comparison. In the context of the present description, the regular inductors or regular magnetic components do not include the physical gaps in the magnetic core structures described above that impart the swing-inductor functionality.

The inductance characteristics of FIG. 14 are shown in the form of inductance plots wherein inductance values correspond to the vertical axis and wherein current values correspond to the horizontal axis. As seen in the inductance plots, the "regular" or conventional non-swing type inductor exhibits a fixed and generally constant inductance value indicated by the horizontal line at the left-hand side of FIG.

14 that represents a constant open circuit inductance (OCL) value over a normal operating range of current values. The open circuit inductance (OCL) value of 80 nH in the example shown is the same in the regular inductor regardless of the actual current load in use within the normal operating range of the inductor. As such, when the regular inductor is operated at a current up to its saturation current ($I_{sat}$) that represents a full load inductance (FLL) or full load operation, the regular inductor exhibits a fixed and generally constant inductance value corresponding to a full load inductance (FLL) value regardless of the actual current load. As the current increases beyond the saturation current, the inductance falls or drops off quickly in a single step in the regular inductor.

In contrast, and as can be seen in the plot for the "swing" inductor, the swing inductor has an inductance that varies with the current load, and specifically can be operated at a higher inductance value under lower current loads that is about the same as the regular conductor, while more gradually changing or swinging to lower inductance values across a range of relatively higher currents. As such, the "swing" inductor exhibits multiple and shallow steps of inductance roll off characteristics while the "regular" or non-swing inductor operates with a single and relatively step roll off characteristic. The multiple step roll off characteristics of the swing inductor provides substantial performance benefits for certain power converter applications relative to a regular inductor (i.e., a non-swing-type inductor). Specifically, the swing inductor may operate with high inductance at a range of light (i.e., lower) current loads until eventually becoming saturated via the magnetic gaps provided in the embodiments described above until the OCL drops and realizes a higher DC bias resistance for a range of heavy (i.e. higher) current loads, while returning back to the high inductance when the current load returns back to a range of light current load. In the example shown in FIG. 14, the swing inductor is configured to operate with high inductance for high efficiency in a full load operating current zone up to 60 A while still maintaining high DC bias resistance with capability to quickly and temporarily operate at lower inductance levels in a stable manner that presents less risk to the operation of a switch (i.e., a MOSFET) connected to the swing inductor at currents above 60 A. As seen in FIG. 14, the swing inductor is operable at similar inductance to the regular inductor up to about 60 A, but at currents above 60 A the swing inductor is operable with inductance values (both higher and lower) that are not possible in the regular inductor.

Figure 15:
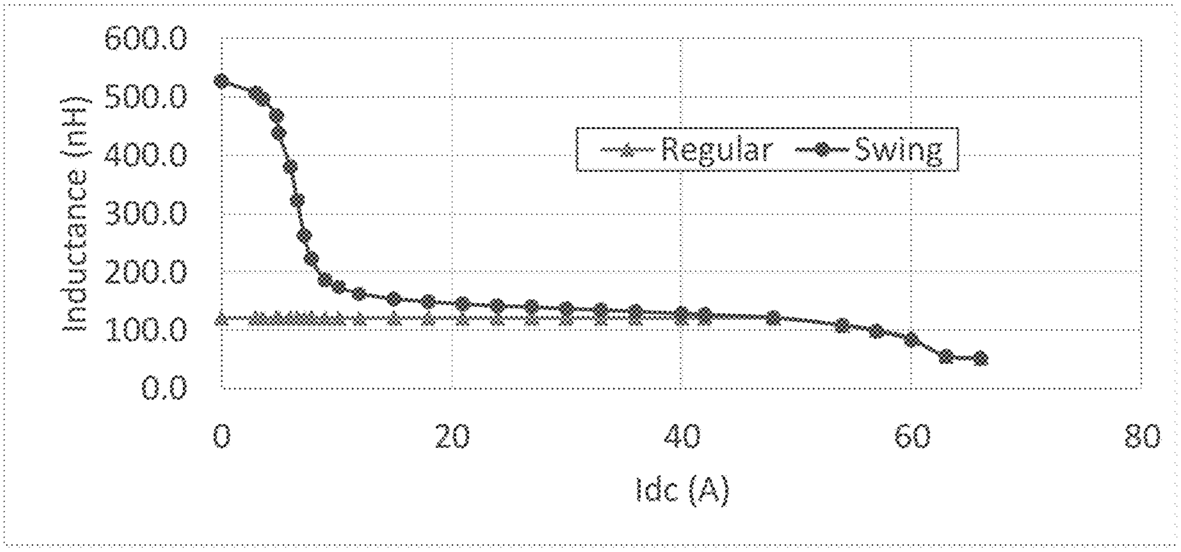
FIG. 15 is a second exemplary graphical illustration of steps of inductance roll off characteristics of a swing inductor in accordance with the present invention.

FIG. 15 is a second exemplary graphical illustration of steps of inductance roll off characteristics of a swing inductor that may be exhibited in the inductor components 100, 200 including the magnetic core structures 102, 150, 160, 170, 202, 220, 230, 240 and 250 described above relative to inductance roll off characteristics of regular or conventional non-swing type inductor components for comparison. In the context of the present description, the regular inductors or regular magnetic components do not include the physical gaps in the magnetic core structures described above that impart the swing-inductor functionality.

In the example of FIG. 15, the swing inductor is configured to operate with a high inductance for high efficiency in full load operating zone up to 60 A and still maintain high DC bias resistance that presents less risk to the operation of a switch (i.e., a MOSFET) connected to the swing inductor at currents above 60 A. As such, and unlike the example shown in FIG. 14, the swing inductor is operable with a much higher initial inductance than the regular inductor at low currents than the regular inductor while rolling off and swinging to a lower but stable inductance just above the inductance of the regular inductor for a second range of current up to about 60 A, and then exhibiting similar inductance roll off to the regular inductor for currents greater than 60 A.

The high initial inductance in the swing inductor shown in FIG. 15 best realized when optional gaps between mating surfaces of two magnetic core pieces are minimized or in the single piece magnetic core constructions discussed above wherein no additional gaps are present.

The swing inductor components described above offer a considerable variety of swing-type inductor functionality in an economical manner while using a small number of component parts that are manufacturable to provide small inductors at relatively low cost with superior performance advantages. Particularly in the case of high power density electrical power system applications such as those described above, the swing-type inductor components described herein are operable with desired package size and desired efficiency that is generally beyond the capability of conventionally constructed surface mount swing-type inductor components.

The benefits and advantages of the inventive concepts are now believed to have been amply illustrated in view of the exemplary embodiments disclosed.

An inductor component for power supply circuitry implemented on a circuit board has been disclosed. The inductor component includes a single conductive coil configured to establish surface mount connections to a single phase of the power supply circuitry, the single conductive coil including elongated first and second legs each having a rectangular cross section, and the elongated first and second legs further being spaced apart but extending generally parallel to one another. A magnetic core structure receives and encloses each of the elongated first and second legs of the single conductive coil, with the magnetic core structure being defined by a bottom wall abutting the circuit board, a plurality of exterior side walls extending above the bottom wall and being spaced from the elongated first and second legs, and a plurality of interior side walls extending above the bottom wall while being adjacent to and surrounding the respective elongated first and second legs. First and second physical gaps are respectively formed in the magnetic core structure, each of the first and second physical gaps extending incompletely through a respective one of an opposing pair of the exterior side walls or an opposing pair of the interior side walls, and each of the first and second physical gaps being located to respectively intersect a flux path generated by current flow in only one of the elongated first or second legs. By virtue of the first and second physical gaps the inductor component operates as a swing-type inductor component with multiple steps of inductance roll off.

Optionally, the first and second physical gaps may be the only physical gaps present in the magnetic core structure. The first and second physical gaps may be respectively formed in an opposing pair of the exterior side walls or may be respectively formed in an opposing pair of the interior side walls.

As further options, the rectangular cross section of the of the elongated first and second legs may include a long side and a short side, and the first and second physical gaps may be elongated grooves extending parallel to the long side in a cross section of the magnetic core structure or perpendicular to the long side in a cross section of the magnetic core structure. The first and second physical gaps may be aligned with one another in the opposing pair of the exterior side walls or an opposing pair of the interior side walls or may be misaligned with one another in the opposing pair of the exterior side walls or an opposing pair of the interior side walls.

The magnetic core structure may optionally be an assembly of identically shaped discrete first and second magnetic core pieces. The identically shaped magnetic core pieces may be abutted side-by-side in a 180° shifted orientation to one another. The identically shaped magnetic core pieces may be E-shaped core pieces each respectively formed with only one physical gap therein. The identically shaped magnetic core pieces may be gapped from one another at a location distinct from the first and second physical gaps.

Alternatively, the magnetic core structure may include an assembly of differently shaped discrete first and second magnetic core pieces. The first magnetic core piece may be a flat core piece, and the second magnetic core piece may be an E-shaped core. As another alternative the magnetic core structure may be a single piece, integrally formed magnetic structure.

As further options, the single conductive coil may complete less than one complete turn of an inductive winding in the magnetic core structure. The single conductive coil may be an inverted U-shaped coil. The magnetic core structure may include a top wall opposing the bottom wall, and a portion of the single conductive coil may be exposed on the top wall. The magnetic core structure may have a height dimension measured perpendicular to the circuit board that exceeds a width dimension and a length dimension measured parallel to the circuit board.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An inductor component for power supply circuitry implemented on a circuit board, the inductor component comprises:

a single conductive coil configured to establish surface mount connections to a single phase of the power supply circuitry, the single conductive coil including elongated first and second legs each having a rectangular cross section, the elongated first and second legs further being spaced apart but extending generally parallel to one another; and a magnetic core structure receiving and enclosing each of the elongated first and second legs of the single conductive coil, the magnetic core structure being defined by a bottom wall abutting the circuit board, a plurality of exterior side walls extending above the bottom wall and being spaced from the elongated first and second legs, and a plurality of interior side walls extending above the bottom wall while being adjacent to and surrounding the respective elongated first and second legs, wherein the magnetic core structure comprises an assembly of identically shaped discrete first and second magnetic core pieces, wherein the identically shaped magnetic core pieces are E-shaped core pieces, and wherein the first magnetic core piece comprises a first physical gap and the second magnetic core piece comprises a second physical gap;

wherein first and second physical gaps are respectively formed in the magnetic core structure, each of the first and second physical gaps extending incompletely through a respective one of an opposing pair of the exterior side walls, and each of the first and second physical gaps being located to respectively intersect a flux path generated by current flow in only one of the elongated first or second legs;

wherein by virtue of the first and second physical gaps the inductor component operates as a swing-type inductor component with multiple steps of inductance roll off.

2. The inductor component of claim 1, wherein the first and second physical gaps are the only physical gaps present in the magnetic core structure.

3. The inductor component of claim 1, wherein the first and second physical gaps are respectively formed in an opposing pair of the exterior side walls.

4. The inductor component claim 1, wherein the rectangular cross section of the of the elongated first and second legs includes a long side and a short side, and wherein the first and second physical gaps are elongated grooves extending parallel to the long side in a cross section of the magnetic core structure.

5. The inductor component of claim 1, wherein the rectangular cross section of the of the elongated first and second legs includes a long side and a short side, and wherein the first and second physical gaps are grooves extending perpendicular to the long side in a cross section of the magnetic core structure.

6. The inductor component of claim 1, wherein the first and second physical gaps are misaligned with one another in the opposing pair of the exterior side walls.

7. The inductor component of claim 1, wherein the first and second physical gaps are misaligned with one another in the opposing pair of the exterior side walls.

8. The inductor component of claim 1, wherein the identically shaped discrete first and second magnetic core pieces are abutted side-by-side in a 180° shifted orientation to one another.

9. The inductor component of claim 8, wherein the identically shaped magnetic core pieces each respectively formed with only one physical gap therein.

10. The inductor component of claim 8, wherein the identically shaped magnetic core pieces are gapped from one another at a location distinct from the first and second physical gaps.

11. The inductor component of claim 1, wherein the single conductive coil completes less than one complete turn of an inductive winding in the magnetic core structure.

12. The inductor component of claim 11, wherein the single conductive coil is an inverted U-shaped coil.

13. The inductor component of claim 1, wherein the magnetic core structure further includes a top wall opposing the bottom wall, and a portion of the single conductive coil being exposed on the top wall.

14. The inductor component of claim 1, wherein the magnetic core structure has a height dimension measured perpendicular to the circuit board that exceeds a width dimension and a length dimension measured parallel to the circuit board.

* * * * *